(12) United States Patent
Backman

(10) Patent No.: US 9,485,684 B2
(45) Date of Patent: Nov. 1, 2016

(54) GENERALIZATION OF QUALITY CLASS INDICES IN A WIRELESS NETWORK

(71) Applicant: TELEFONAKTIEBOLAGET L M ERICSSON (PUBL), Stockholm (SE)

(72) Inventor: Jan Backman, Kärna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 141 days.

(21) Appl. No.: 14/383,808

(22) PCT Filed: Mar. 13, 2013

(86) PCT No.: PCT/EP2013/055121
§ 371 (c)(1),
(2) Date: Sep. 8, 2014

(87) PCT Pub. No.: WO2013/135762
PCT Pub. Date: Sep. 19, 2013

(65) Prior Publication Data
US 2015/0131436 A1 May 14, 2015

Related U.S. Application Data

(60) Provisional application No. 61/610,230, filed on Mar. 13, 2012.

(51) Int. Cl.
*H04W 28/02* (2009.01)
*H04L 12/24* (2006.01)

(52) U.S. Cl.
CPC ...... *H04W 28/0268* (2013.01); *H04L 41/5022* (2013.01)

(58) Field of Classification Search
None
See application file for complete search history.

(56) References Cited

U.S. PATENT DOCUMENTS

| | | | |
|---|---|---|---|
| 2011/0106933 A1* | 5/2011 | Lovsen | H04L 12/14 709/223 |
| 2011/0199903 A1 | 8/2011 | Cuervo | |
| 2011/0202485 A1* | 8/2011 | Cutler | H04W 76/022 706/12 |
| 2011/0208853 A1* | 8/2011 | Castro-Castro | H04L 12/14 709/223 |
| 2012/0002540 A1 | 1/2012 | Siddam et al. | |
| 2012/0250660 A1* | 10/2012 | Karlsson | H04W 76/02 370/332 |
| 2013/0176908 A1* | 7/2013 | Baniel | H04L 12/1407 370/259 |
| 2014/0078899 A1* | 3/2014 | Zhou | H04L 41/0893 370/230 |

FOREIGN PATENT DOCUMENTS

WO 2011085803 A1 7/2011

* cited by examiner

*Primary Examiner* — Min Jung
(74) *Attorney, Agent, or Firm* — Rothwell, Figg, Ernst & Manbeck, P.C.

(57) ABSTRACT

A PCEF (400) for a cellular system, arranged (405, 410) to receive data packets from at least one other node via a certain Radio Access Technology, RAT, the PCEF (400) also being arranged to communicate with a PCRF via a PCC interface. The PCEF (400) is further arranged (425, 430) to set up Service Data flows, SDFs, which SDFs are defined for the PCEF (400) by the PCRF over the PCC interface and which comprise filters for received data packets. Said filters define a Quality Class Index, a QCI, for each received data packet, and the PCEF (400) is arranged (415, 420) to interpret QCIs for received data packets up to and including a predefined value in a first predefined manner for all RATs, and to interpret (415, 420) QCIs over said predefined value in a second predefined manner.

10 Claims, 5 Drawing Sheets

| QCI | GERAN | UTRAN | LTE |
|---|---|---|---|
| QCI ≤ N | QoS=N | QoS=N | QoS=N |
|  |  |  |  |
| QCI = N+2 | Interpretation X, Value =Y | Interpretation Z, Value =W | Interpretation Q, Value =R |

Fig 2

| QCI | GERAN | UTRAN | LTE |
|---|---|---|---|
| QCI ≤ N | QoS=N | QoS=N | QoS=N |
| ....... | ....... | ....... | ....... |
| QCI=N+2 | SIRIG GTP_U Ext header Marking, Value =17 | SIRIG GTP_U Ext header Marking, Value =19 | Interpretation Q, Value =Y |
| QCI=N+3 | QCI=QoS, Value = 3 | QCI=QoS, Value = 6 | QCI=QoS, Value = 5 |
| ....... | ....... | ....... | ....... |

Fig 3

GENERALIZATION OF QUALITY CLASS INDICES IN A WIRELESS NETWORK

CROSS REFERENCE TO RELATED APPLICATION(S)

This application is a 35 U.S.C. §371 National Phase Entry Application from PCT/EP2013/055121, filed Mar. 13, 2013, designating the United States, and also claims the benefit of U.S. Provisional Application No. 61/610,230, filed Mar. 13, 2012. The disclosures of both applications are incorporated herein in their entirety by reference.

TECHNICAL FIELD

The present invention discloses extended use of QCIs, QoS Class Index.

BACKGROUND

From 3GPP Release 7 and later, the PCC (Policy and Charging Control) interface which is the interface between the PCEF (Policy and Charging Enforcement Function) and the Policy and Charging Rules Function (PCRF) is used to control the quality of service in a cellular system or network, the control being carried out from the PCRF, with the quality of service being defined by the parameters QCI (QoS Class Index, QoS=Quality of Service) and ARP (Allocation and Retention Priority).

SUMMARY

It is an object of the invention to obtain an improved use of the parameter QCI. This object is addressed by means of a Policy and Charging Enforcement Function, a PCEF, for a cellular system. The PCEF is arranged to receive data packets from at least one other node in the cellular system via a certain Radio Access Technology, RAT. The PCEF is also arranged to communicate with a Policy and Charging Rules Function, a PCRF, via a Policy and Charging Control, PCC, interface, and the PCEF is further arranged to set up Service Data flows, SDFs. The SDFs are defined for the PCEF by the PCRF over the PCC interface and comprise filters for received data packets, and the filters define a Quality Class Index, a QCI, for each received data packet.

The PCEF is arranged to interpret QCIs for received data packets up to and including a predefined value in a first predefined manner for all RATs and to interpret QCIs over the predefined value in a second predefined manner.

In embodiments of the PCEF, the second predefined manner is individual for each RAT.

In embodiments of the PCEF, the first predefined manner is to interpret the QCIs as bearers.

In embodiments of the PCEF, the second predefined manner comprises one or more of:
A packet data priority level,
A QoS level,
A marking in a header extension of GTP-U, GPRS Tunneling Protocol.

In embodiments of the PCEF, the filters are also arranged to identify an Allocation and Retention Priority, ARP, value for received data packets, and to pair each ARP with a QCI.

As can be seen from the above, a QCI value used in the PCC communication in the network (from the PCRF to the PCEF, which can be located in a PGW/GGSN) can be interpreted not only as QCI information but also as conveying other information, depending on the QCI value: There are (at present) nine standard QCI classes, but there is also a large number of operator controlled (operator internal) QCI values defined. These operator controlled QCIs have no standard interpretation, and could therefore be standardized or otherwise used for other purposes, e.g. as traffic marking within GTP-U (GPRS Tunneling Protocol User plane) with extension headers instead of being interpreted as dedicated bearers as currently defined.

This use of the operator controlled QCIs has no impact at all on the PCC interface in order for it to function as described herein. Furthermore, how a QCI value is used by the PCEF is not "seen" by the PCRF. Therefore, a certain QCI can be used in one manner for one RAT type, e.g. LTE, and in a second manner for another RAT type, e.g. as packet marking in the GTP-U extension header in 2G systems.

Thus, one and the same QCI value above the predefined value may have different meanings for different RAT technologies. For example, a QCI value above the predefined value may for GERAN technology be interpreted as a priority level for a data packet, while the same QCI value for UTRAN technologies is interpreted as just another QCI, thus giving it a meaning of a QoS value, and for LTE technologies, the same QCI value has yet another, predefined, meaning.

The PCEF of the invention can be realized in various nodes in a cellular system; examples of such nodes include PGW and GGSN, as well as, in LTE technologies, the MAG node.

BRIEF DESCRIPTION OF THE DRAWINGS

The invention will be described in more detail in the following, with reference to the appended drawings, in which
FIGS. 2 and 3 show examples of tables of QCI and their use.

DETAILED DESCRIPTION

Figure 1:
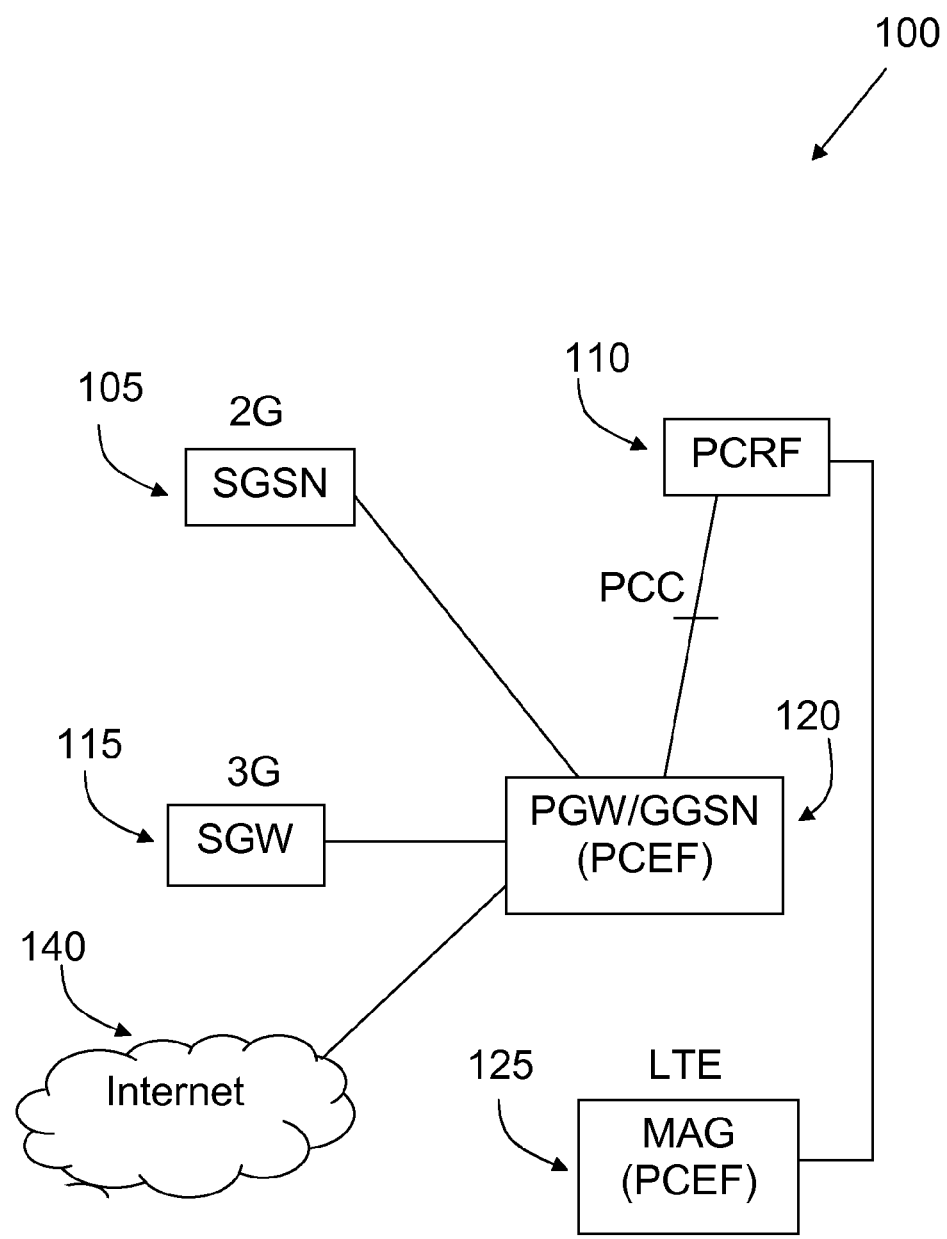
FIG. 1 shows an example of a cellular system.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows an example of a cellular system 100 in which the invention is applied. The PCEF function is shown as being located in a Packet Data Gateway, a PGW, or in a GPRS Support Node, a GGSN, shown jointly as PGW/GGSN 120. However, the PCEF function can in principle be located anywhere in the system, as deemed suitable by the system operator, such as in a Mobile Access Gateway node 125, a MAG, for CDMA or LTE access.

As shown in FIG. 1, the PCEF is arranged to communicate, i.e. receive, data packets from other nodes in the system, which nodes may use different Radio Access Technologies, RATs. Examples of such nodes include an SGSN 105 which uses 2G technology and an SGW 115 which uses 3G technology, as well as an Internet node 140.

The PCEF function is arranged to communicate with a Policy and Charging Rules Function, a PCEF 110, via an interface known as the Policy and Charging Control interface, the PCC interface.

The PCRF 110 defines Service data flows, SDFs, for the PCEF via the PCC interface. The SDFs comprise filters for the data packets which the PCEF receives, and one role of the filters is to define the Quality of Service, QoS, level for the data packets as identified by the filters. To this end, for each data packet, the filters point to or identify a QCI and possibly also an Allocation and Retention Priority, ARP, so that for each data packet there is a QCI or a QCI and ARP combination, which is then realized by the PCEF.

Regarding the SDFs, as mentioned above, as mentioned, they comprise filters for the data packets which the PCEF receives. Apart from the definition of QoS, the filters may define such parameters as bit rate, drop probability, latency and possibly other parameters which can be used to optimize or define data packet transport. In principle, the filters of an SDF treats all data packets, regardless of which node that the PCEF receives the data packet from, but in practice, there will often be dedicated SDFs and thus dedicated filters between the PCEF and the various other nodes in the system.

A function of the PCEF lies in the treatment of these QCI/ARP combinations. In the present case, the QCI for a data packet is interpreted with different meanings depending on the QCI value: at present there are nine standardized QCI values, which each signify a certain QoS level or value. These nine standardized values can be signaled as 1-9, or as 0-8, for example. Naturally, the value nine is merely an example, the upper limit of where the QCIs are automatically interpreted as meaning a certain QoS level or value can of course vary. Hence, this can be seen as interpreting QCIs up to nine (or another predefined limit) in a first predetermined manner.

Turning now to how QCIs above nine (or another predefined limit) are, in the PCEF disclosed herein, interpreted by the PCEF as meaning that the QCI should be interpreted in a second predetermined manner. This second predetermined manner may include the QCI values being interpreted as QoS values, but, in one example, the interpretation of QCIs above nine include one or more of:
A packet data priority level,
A QoS level,
A marking in a header extension of GTP-U, GPRS Tunneling Protocol.

In embodiments, the second predetermined manner varies, i.e. is individual for the RAT used by the node that a data packet is received from.

This use of QCIs is illustrated in FIG. 2, which shows an example of how QCIs can be interpreted by the PCEF function in the manner described above: For al RATs, QCIs up to and including a certain value, shown as N in FIG. 2, are interpreted as meaning the corresponding QoS. In other words, for example, a QCI of 5 will be interpreted as meaning a QoS level of 5.

However, QCI values which exceed the predefined value N are in this example interpreted with another meaning, for example a packet priority value. As also indicated in FIG. 2, the PCEF may also be designed so that it interprets a certain QCI value larger than N differently for different RATs, i.e. for GERAN, the interpretation is X, for UTRAN it is Z and for LTE it is Q, where X, Z and Q will be exemplified below. In addition, the different interpretations for QCI values larger than N for different RATSs may comprise the interpretation or application as such as well as the value used by the application. For example, a QCI value of N+2 may be interpreted as application X, value Y for GERAN, as application Z, value W for UTRAN, and as application Q, value R for LTE technology. Take for example a case where N=9: then, if the QCI value is 18, this can be interpreted as a packet data priority level 12 if the RAT is GERAN, as QoS value/level 9 if the RAT is UTRAN, and as yet a third application with, for example, value 15, if the RAT is LTE.

Thus, one way in which the PCEF interprets the QCIs may be in the form of a table which is maintained by the PCEF, such as the table indicated in FIG. 2.

Another example of interpretations of QCIs by the PCEF is show in FIG. 3: Again, all QCIs up to and including a predefined value N, e.g. nine, are interpreted as QoS values, regardless of RAT, whilst QCIs above the predefined value N are interpreted in another manner, which may include QoS values: In the example of FIG. 3, the PCEF also has the ability to interpret QCIs above the value of N differently for different RATs. An example is where the QCI=N+2, which for GERAN is interpreted as SIRIG GTP_U Ext header Marking, Value=17, and for UTRAN, QCI=N+2 is interpreted as SIRIG GTP_U Ext header Marking, Value=19, while for LTE, QCI=N+2 is interpreted in another manner, here shown as "Interpretation Q, Value Y".

In the case of QCI=N+3, the QCI is interpreted as a QoS value for all RATs, but with different levels, which could of course also have been the same level. The levels shown are 3 for GERAN, 6 for UTRAN and 5 for LTE, which of course are merely examples.

Figure 4:
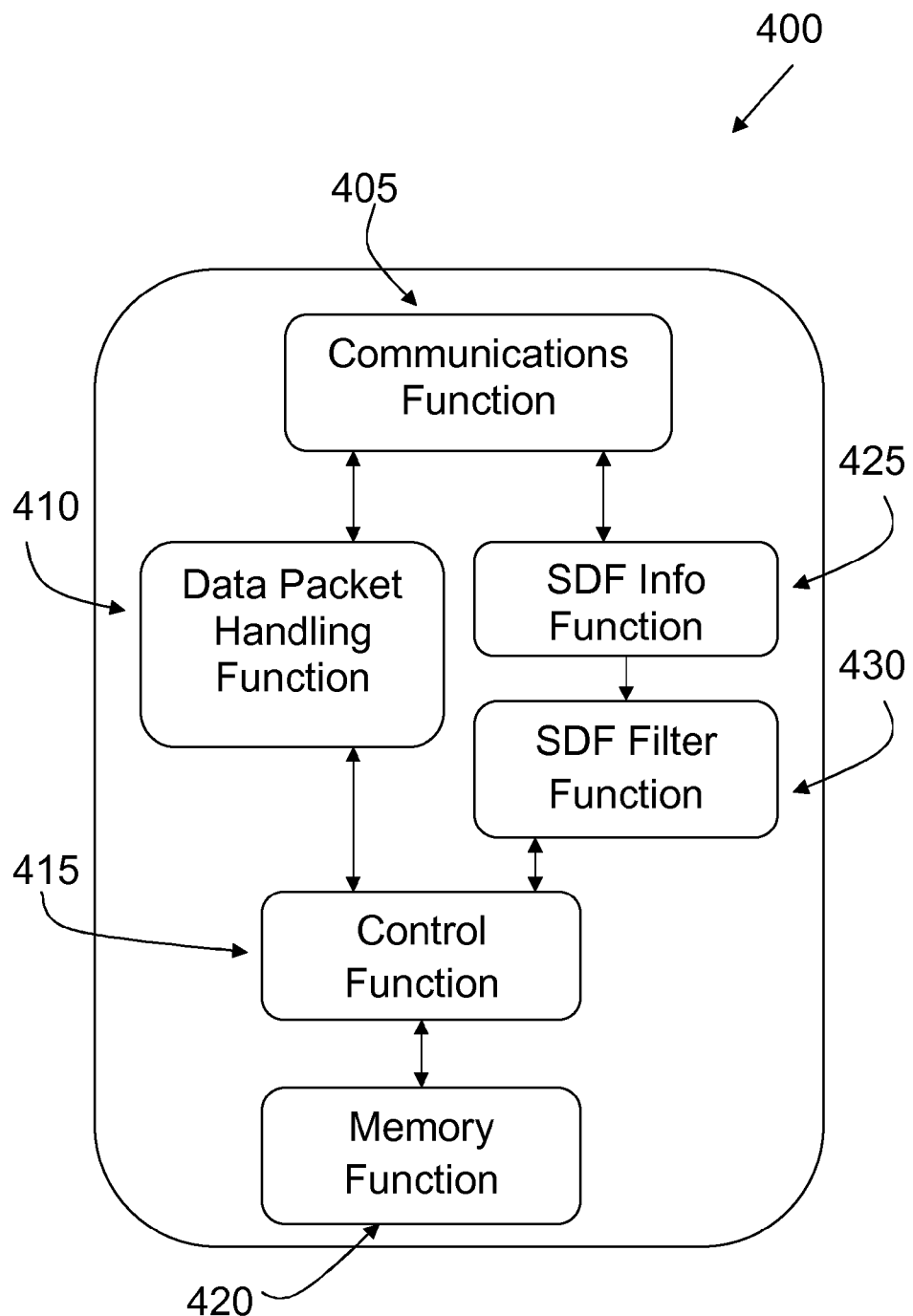
FIG. 4 shows functional blocks of a PCEF.

FIG. 4 shows a PCEF 400 with functional blocks: As shown in FIG. 4, the PCEF comprises a Communications Function 405, which is responsible for communication with the PCRF over the PCC interface, as well as for the communication with other nodes in the system, such as SGSNs and SGWs, from which data packets are received. Data packets which are received are processed by a Data Packets function 410, and information regarding SDFs from the PCRF via the PC interface is processed by an SDF information function 425, a function which communicates with an SDF Filter Function 430, which is responsible for establishing the SDF filters for received data packets.

The function of the PCEF 400 in its entirety and of the units 410 and 430 in particular is handled by a Control Function 415, which has access to a Memory function 420, where, for example, tables such as those shown in FIGS. 2 and 3 may be stored.

Figure 5:
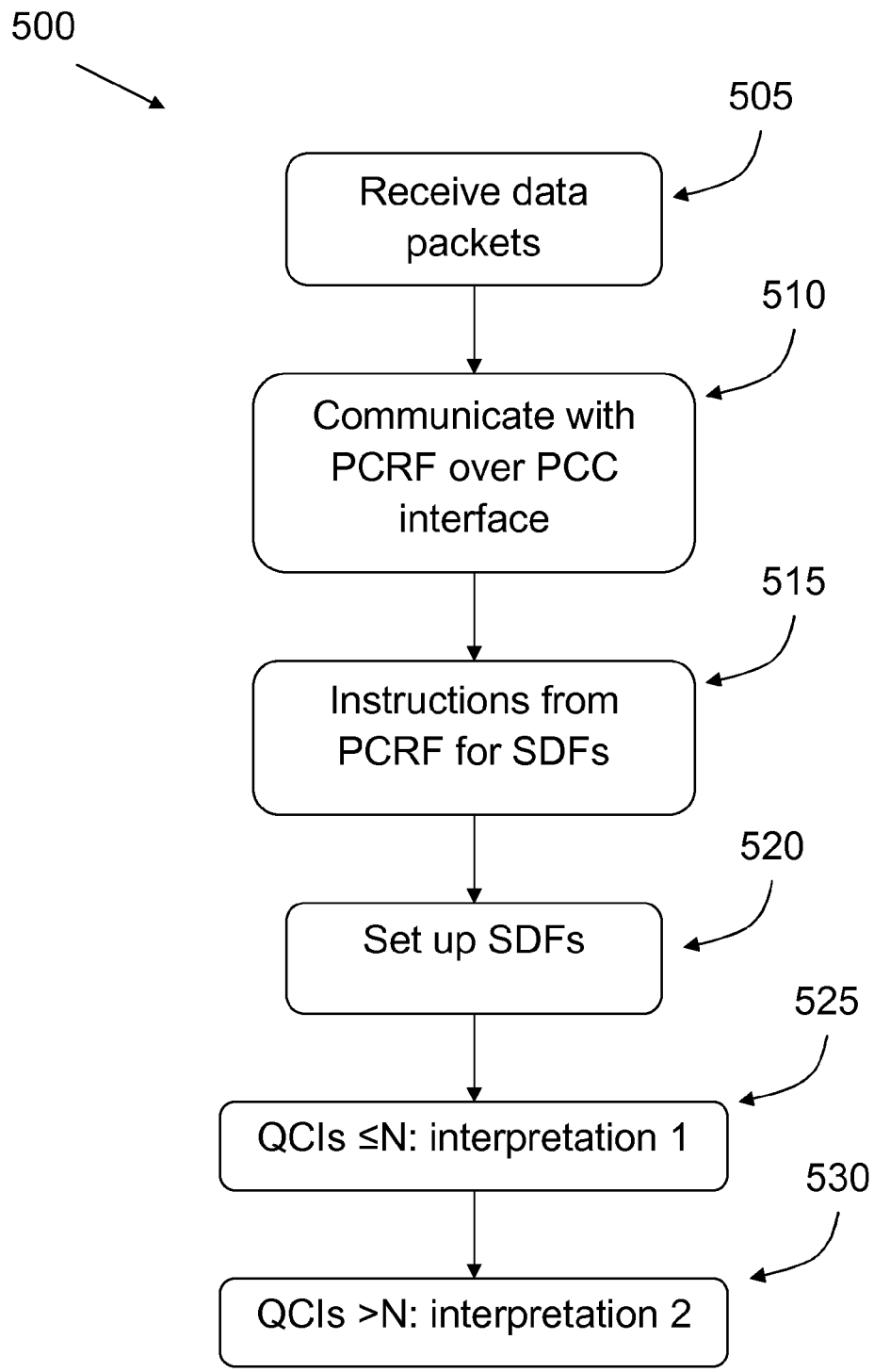
FIG. 5 shows a flow chart of a method for use in a PCEF.

FIG. 5 shows a flow chart of a method 500 for use in a Policy and Charging Enforcement Function, a PCEF in a cellular system. As shown in FIG. 5, the method 500 comprises, step 505, receiving data packets from at least one other node in the cellular system via a certain Radio Access Technology, RAT. The method 500 also comprises communicating, step 510, with a Policy and Charging Rules Function, a PCRF, via a Policy and Charging Control, PCC, interface, and receiving definitions, step 515, of Service Data flows, SDFs, from the PCC. The SDFs comprise filters for received data packets, which filters define a Quality Class Index, a QCI, for each received data packet. The method 500 further comprises setting up, step 520, said Service Data flows, SDFs with their respective filters, and the method 500 comprises interpreting, step 525, QCIs for received data packets up to and including a predefined value in a first predefined manner for all RATs, and interpreting, step 530, QCIs over said predefined value in a second predefined manner.

In embodiments according to the method 500, the second predefined manner is individual for each RAT.

In embodiments according to the method 500, the first predefined manner is to interpret the QCIs as bearers.

In embodiments according to the method 500, the second predefined manner comprises one or more of:
- A packet data priority level,
- A QoS level,
- A marking in a header extension of GTP-U, GPRS Tunneling Protocol.

In embodiments according to the method 500, said filters also identify an Allocation and Retention Priority, ARP, value for received data packets and pair each ARP with a QCI.

An advantage of the PCEF and of the method described herein is that no new parameters are needed in the PCC interface between the PCEF and the PCRF, but the capability of the PCEF is still enhanced. Also, no new QOS paradigm needs to be defined and handled. Since no new QoS paradigms are used, the existing handling for QCI/ARP can be reused in FTP CDRs (Gz), Online charging CDR handling (Gy/Ro) and other charging interfaces such as Rf. The differences in packet treatment are still within the scope of the definitions for non-GBR bearers within packet core.

ABBREVIATIONS USED IN THIS TEXT

3GPPP Third Generation Partnership project
ARP Allocation and Retention Priority
BSS Base Station Subsystem
GERAN GSM EDGE Radio Access Network
GGSN GPRS Support Node
GPRS General Packet Radio Service
GTP-U GPRS Tunneling Protocol, User plane
LTE Long Term Evolution
MAG Mobile Access Gateway
PCC Policy and Charging Control
PCEF Policy and Charging Enforcement Function
PCRF Policy and Charging Rules Function
PGW Packet Data Network Gateway
RAT Radio Access Technology
QCI QoS Index
QoS Quality of Service
UTRAN Universal Terrestrial Radio Access Network In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings.

The invention claimed is:

1. A network node including a Policy and Charging Enforcement Function, PCEF, for a cellular system, the network node configured to, via the PCEF:
   - receive data packets from at least another node in the cellular system via a certain Radio Access Technology, RAT;
   - communicate with a Policy and Charging Rules Function, PCRF, via a Policy and Charging Control, PCC, interface;
   - set up one or more Service Data flows, SDFs, which one or more SDFs are defined for the PCEF by the PCRF over the PCC interface and which comprise filters for the received data packets, said filters defining a Quality Class Index, a QCI, for each received data packet;
   - for each received data packet, in response to determining that a corresponding QCI value is less than or equal to a predefined value, interpret the corresponding QCI in accordance with a first predefined manner for all RATs; and
   - for each received data packet, in response to determining that a corresponding QCI value is greater than the predefined value, interpret the corresponding QCI in accordance with a second predefined manner.

2. The network node of claim 1, wherein said second predefined manner is individual for each RAT.

3. The network node of claim 1, wherein said first predefined manner is to interpret the QCIs as bearers.

4. The network node of claim 1, wherein said second predefined manner includes interpreting the corresponding QCI in accordance with one or more of:
   - a packet data priority level;
   - a QoS level; and
   - a marking in a header extension of GTP-U, GPRS Tunneling Protocol.

5. The network node of claim 1, wherein said filters are also arranged to identify an Allocation and Retention Priority, ARP, value for the received data packets and to pair each ARP with a QCI.

6. A method performed in a network node including a Policy and Charging Enforcement Function, PCEF in a cellular system, the method comprising:
   - receiving data packets from at least another node in the cellular system via a certain Radio Access Technology, RAT;
   - communicating with a Policy and Charging Rules Function, PCRF, via a Policy and Charging Control, PCC, interface;
   - receiving definitions of one or more Service Data flows, SDFs, from the PCC, said one or more SDFs comprising filters for received data packets, which filters define a Quality Class Index, a QCI, for each received data packet;
   - setting up said one or more SDFs with their respective filters;
   - for each received data packet, in response to determining that a corresponding QCI value is less than or equal to a predefined value, interpreting the corresponding QCI in accordance with a first predefined manner for all RATs; and
   - for each received data packet, in response to determining that a corresponding QCI value is greater than the predefined value, interpreting the corresponding QCI in accordance with a second predefined manner.

7. The method of claim 6, wherein said second predefined manner is individual for each RAT.

8. The method of claim 6, wherein said first predefined manner is to interpret the QCIs as bearers.

9. The method of claim 6, wherein said second predefined manner includes interpreting the corresponding QCI in accordance with one or more of:
   - a packet data priority level;
   - a QoS level; and
   - a marking in a header extension of GTP-U, GPRS Tunneling Protocol.

10. The method of claim 6, wherein said filters also identify an Allocation and Retention Priority, ARP, value for received data packets, and wherein said filters pair each ARP with a QCI.

* * * * *